US012754914B2

United States Patent
(12) United States Patent
Joynt

(10) Patent No.: US 12,754,914 B2
(45) Date of Patent: Oct. 6, 2026

(54) POLLING AND SERIAL PROMPTING FOR TRAVERSAL OF MULTIPLE SPECIALIST LANGUAGE MODELS

(71) Applicant: Insight Direct USA, Inc., Chandler, AZ (US)

(72) Inventor: Scott Joynt, Delaware, OH (US)

(73) Assignee: Insight Direct USA, Inc., Chandler, AZ (US)

(*) Notice: Subject to any disclaimer, the term of this patent is extended or adjusted under 35 U.S.C. 154(b) by 0 days.

(21) Appl. No.: 18/643,804

(22) Filed: Apr. 23, 2024

(65) Prior Publication Data

US 2025/0117388 A1 Apr. 10, 2025

Related U.S. Application Data

(60) Provisional application No. 63/543,454, filed on Oct. 10, 2023.

(51) Int. Cl.
*G06F 16/2455* (2019.01)
*G06F 40/30* (2020.01)
*G06N 20/00* (2019.01)

(52) U.S. Cl.
CPC .......... *G06F 16/2455* (2019.01); *G06F 40/30* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 6,144,537 | A | 11/2000 | Boteler |
| 8,972,396 | B1 | 3/2015 | Zhang et al. |
| 9,219,660 | B2 | 12/2015 | Sanches |
| 9,658,081 | B2 | 5/2017 | Vaswani et al. |
| 10,817,667 | B2 | 10/2020 | Yi et al. |
| 11,012,381 | B2 | 5/2021 | Chavda |
| 11,068,519 | B2 | 7/2021 | Duan et al. |
| 11,132,504 | B1 | 9/2021 | Mont-Reynaud et al. |
| 11,200,885 | B1 | 12/2021 | Mandal et al. |
| 11,269,502 | B2 | 3/2022 | Rosenberg et al. |
| 11,321,329 | B1 | 5/2022 | Shih et al. |

(Continued)

FOREIGN PATENT DOCUMENTS

| | | |
|---|---|---|
| BR | PI0515169 A2 | 7/2008 |
| CN | 102866990 A | 1/2013 |

(Continued)

OTHER PUBLICATIONS

Juneja, G., Dutta, S., Chakrabarti, S., Manchhanda, S.; Chakraborty, T. (2023). Small Language Models Fine-Tuned to Coordinate Larger Language Models Improve Complex Reasoning.

*Primary Examiner* — Dawaune A Conyers
(74) *Attorney, Agent, or Firm* — Kinney & Lange, P.A.

(57) ABSTRACT

A method of processing a compound prompt using a plurality of specialized large language models (LLMs) includes decomposing the compound prompt into a plan with multiple steps. For each step, an approach defining a subset of the specialized LLMs is selected and executed to produce multiple model outputs, and these model outputs are collectively used to generate a step output. The step outputs associated with each step are assembled into a syntactically and semantically coherent final output via an integration module utilizing a large language model.

19 Claims, 9 Drawing Sheets

(56) References Cited

U.S. PATENT DOCUMENTS

| | | | |
|---|---|---|---|
| 11,416,740 | B2 | 8/2022 | Nokbak Nyembe et al. |
| 11,586,986 | B2 | 2/2023 | Carullo et al. |
| 11,797,780 | B1 | 10/2023 | Finegan et al. |
| 11,875,123 | B1 | 1/2024 | Ben David et al. |
| 11,914,923 | B1 | 2/2024 | Fotedar et al. |
| 12,001,462 | B1 | 6/2024 | Madisetti et al. |
| 12,626,695 | B1 | 5/2026 | Balasubramaniam et al. |
| 2005/0223067 | A1 | 10/2005 | Buchheit et al. |
| 2013/0157701 | A1 | 6/2013 | Riddle et al. |
| 2014/0058724 | A1 | 2/2014 | Barve et al. |
| 2017/0344902 | A1 | 11/2017 | Shacham et al. |
| 2019/0036849 | A1 | 1/2019 | Uppala et al. |
| 2019/0089656 | A1 | 3/2019 | Johnson et al. |
| 2019/0171712 | A1 | 6/2019 | Eisenzopf |
| 2019/0294633 | A1 | 9/2019 | Dembo et al. |
| 2020/0202846 | A1* | 6/2020 | Bapna .................... G10L 15/16 |
| 2021/0157986 | A1 | 5/2021 | Eisenzopf |
| 2021/0192368 | A1 | 6/2021 | Schall |
| 2021/0200798 | A1 | 7/2021 | Venkataraman et al. |
| 2021/0312260 | A1 | 10/2021 | Wu et al. |
| 2021/0342743 | A1 | 11/2021 | Woolf |
| 2021/0390951 | A1 | 12/2021 | Gadde et al. |
| 2022/0036233 | A1 | 2/2022 | Barra |
| 2022/0093101 | A1 | 3/2022 | Krishnan et al. |
| 2022/0171938 | A1 | 6/2022 | Jalaluddin et al. |
| 2022/0232126 | A1 | 7/2022 | Naidu et al. |
| 2022/0318685 | A1 | 10/2022 | Sivakumar et al. |
| 2023/0107309 | A1 | 4/2023 | Patel et al. |
| 2023/0153687 | A1 | 5/2023 | Vu et al. |
| 2023/0153688 | A1 | 5/2023 | Vu et al. |
| 2023/0244938 | A1 | 8/2023 | Wei et al. |
| 2023/0306205 | A1 | 9/2023 | Maeder et al. |
| 2023/0316138 | A1 | 10/2023 | Nguyen et al. |
| 2023/0409800 | A1 | 12/2023 | Skeens et al. |
| 2024/0062021 | A1 | 2/2024 | Tangari et al. |
| 2024/0134850 | A1 | 4/2024 | Xu et al. |
| 2024/0370473 | A1* | 11/2024 | Madisetti ................ G06F 40/30 |
| 2025/0013921 | A1 | 1/2025 | Moradi et al. |
| 2025/0086011 | A1 | 3/2025 | Pack et al. |
| 2025/0086234 | A1* | 3/2025 | Riva-Cambrin ...... G10L 15/183 |
| 2025/0086405 | A1* | 3/2025 | Mishra ................... G06N 20/00 |
| 2025/0103801 | A1* | 3/2025 | Child ...................... G06F 40/20 |

FOREIGN PATENT DOCUMENTS

| | | | |
|---|---|---|---|
| CN | 102884765 | A | 1/2013 |
| CN | 110532365 | A | 12/2019 |
| CN | 115344683 | A | 11/2022 |
| EP | 4099166 | A1 | 12/2022 |
| IN | 202011040411 | A | 7/2022 |
| KR | 101480711 | B1 | 1/2015 |
| WO | 2016012903 | A1 | 1/2016 |
| WO | 2016057001 | A1 | 4/2016 |
| WO | 2022248723 | A1 | 12/2022 |

* cited by examiner

POLLING AND SERIAL PROMPTING FOR TRAVERSAL OF MULTIPLE SPECIALIST LANGUAGE MODELS

CROSS-REFERENCE TO RELATED APPLICATION

The present application claims priority to U.S. provisional patent application Ser. No. 63/543,454 by S. Joynt, filed Oct. 10, 2023 and entitled "COMPOUND PROMPT PROCESSING USING MULTIPLE INTEGRATED DOMAIN-SPECIALIZED LANGUAGE MODELS."

FIELD OF THE INVENTION

The present disclosure relates generally to machine learning (ML), and more particularly to systems for processing complex or compound queries using large language models (LLMs).

BACKGROUND

ML language models, including large language models, are commonly used to generate responses to queries. In some cases, complex or compound queries can be addressed by decomposing queries into a series of separate steps or tasks performed sequentially by a language model. In such systems, the language model used is preferably a large language model trained on a diverse range of inputs for many purposes, so as to offer versatility needed to identify and execute steps or tasks of any type needed to address the complex or compound query or prompt.

SUMMARY

This disclosure presents a method of processing a compound prompt. This method uses a plurality of specialized large language models (LLMs) includes decomposing the compound prompt into a plan with multiple steps. For each step, an approach defining a subset of the specialized LLMs is selected and executed to produce multiple model outputs, and these model outputs are collectively used to generate a step output. The step outputs associated with each step are assembled into a syntactically and semantically coherent final output via an integration module utilizing a large language model.

This disclosure also presents a system for generating a response to a complex prompt. This system includes an input device, a logic processor, a plurality of specialized LLMs each having a corresponding domain of specialization, and a manager. The manager includes a planner, a selection module, and an integration module. The planner is operable to decompose the complex prompt into a plan having a plurality of steps. The selection module is operable, for each of the plurality of steps, to identify an approach for defining a step-specific subset of the plurality of LLMs, and for generating a single step output corresponding to that step using outputs from each of step-specific subset of the plurality of LLMs. The integration module is operable to generate a language output responsive to the complex prompt from all of the step outputs corresponding to each of the plurality of steps.

The present summary is provided only by way of example, and not limitation. Other aspects of the present disclosure will be appreciated in view of the entirety of the present disclosure, including the entire text, claims, and accompanying figures.

Figure 5:
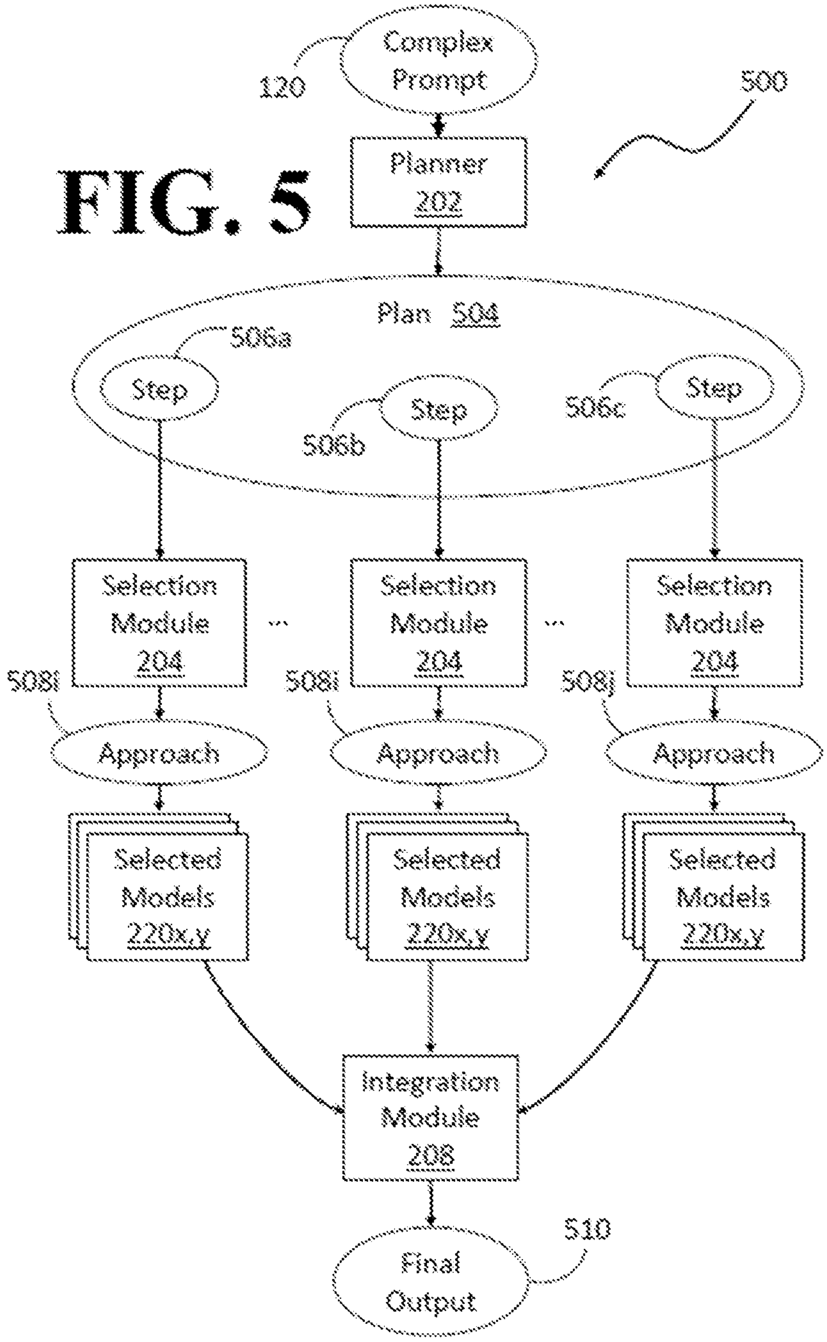
FIG. 5 is a process flowchart illustrating decomposition and processing of a complex prompt in several steps using the complex prompt handling system of FIGS. 1 and 2.

FIG. **6*a* is a process flowchart illustrating a polling approach to processing of a step of FIG. 5** in greater detail.

FIG. **6*b* is a process flowchart illustrating a feed-forward approach to processing of a step of FIG. 5** in greater detail.

FIG. **6*c* is a process flowchart illustrating a hybrid approach to processing of a step of FIG. 5** in greater detail.

Figure 1:
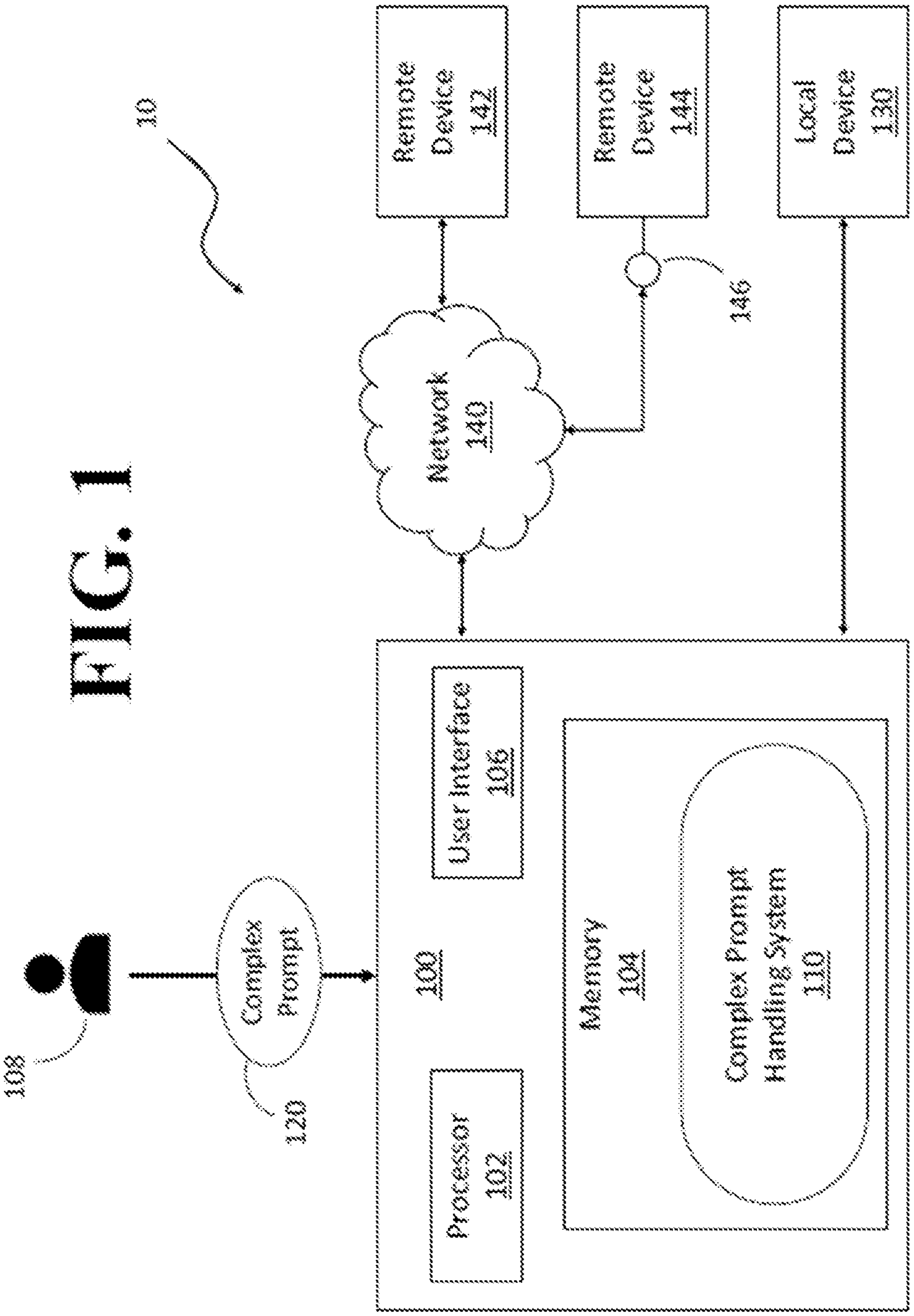
FIG. 1 is a schematic diagram of a query processing system including a complex prompt handling system.
Figure 2:
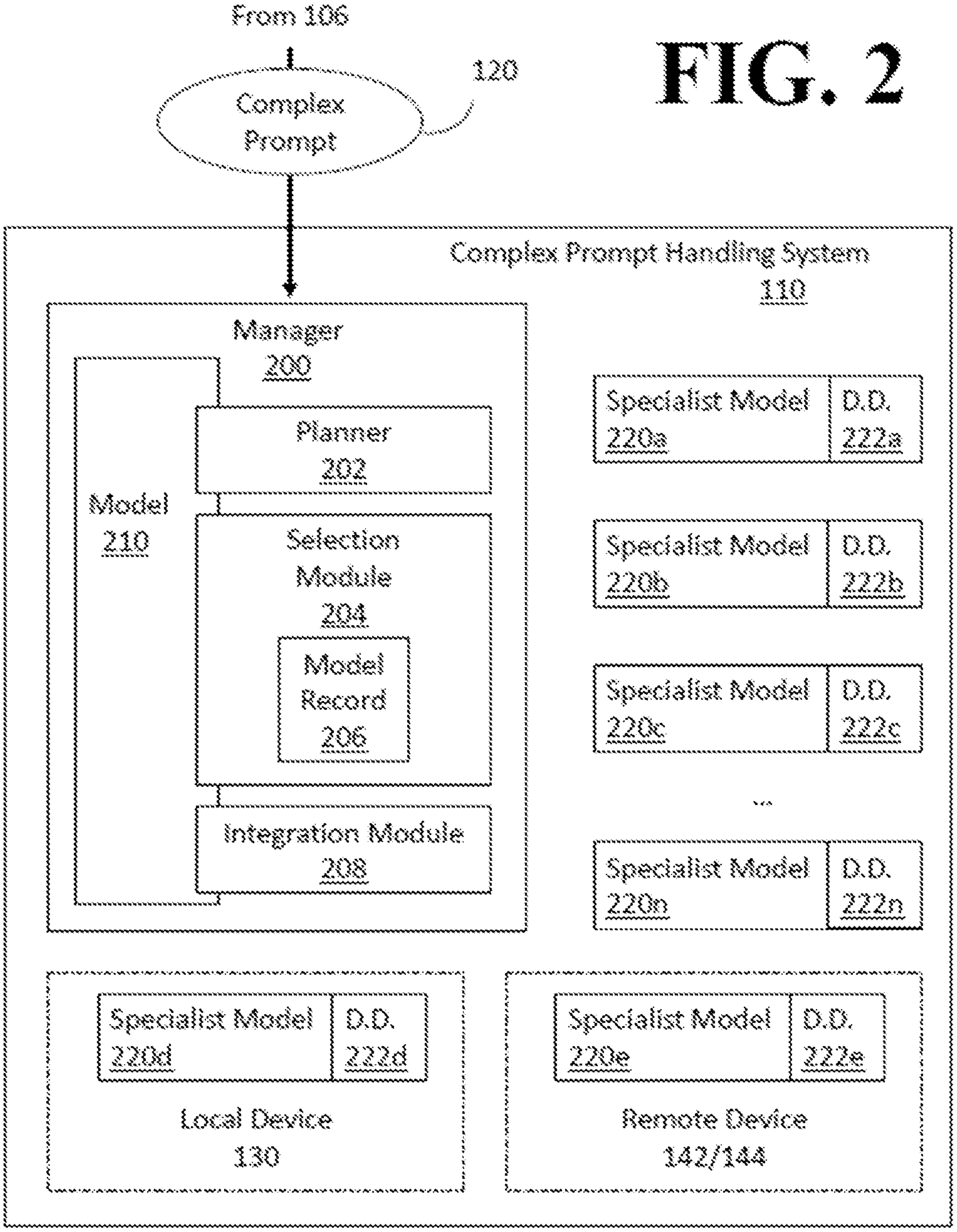
FIG. 2 is a schematic diagram of the complex prompt handling system of FIG. 1.
Figure 7:
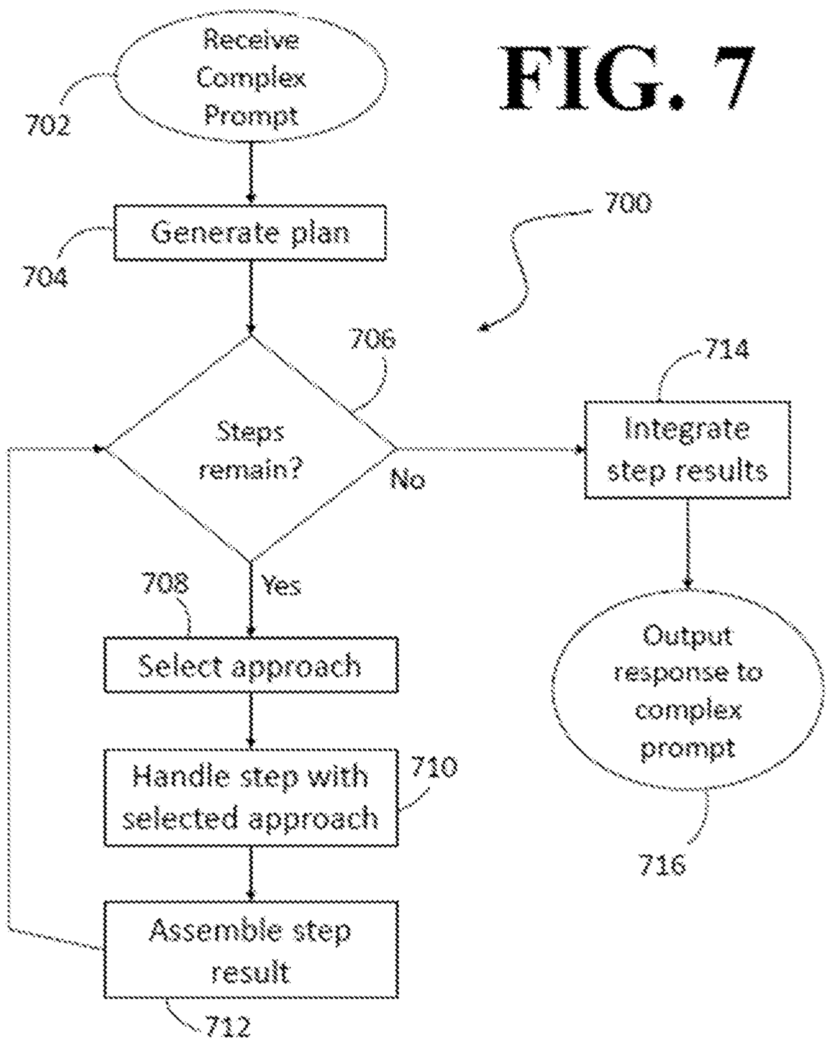

FIG. 7 is a method flowchart illustrating a method of generating an output to a complex prompt using the complex prompt handling system of FIGS. 1 and 2 as set forth generally in FIGS. 5 and any combination of FIGS. **6*a*-6*c***.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure presents methods and systems for processing complex or compound queries or prompts using a system including multiple separately specialized large language models. The term "compound prompt" can refer to a prompt explicitly including multiple separate tasks or steps, e.g., "(1) identify the three highest-selling jazz musicians of the 1970s, and then (2) generate a report comparing the musical styles of these three musicians." The term "complex prompt" can refer more generally to any prompt requiring multiple steps to process, either implicitly or explicitly, e.g., "generate a report comparing the musical styles of the three highest-selling jazz musicians of the 1970s." Although distinctions can be drawn between complex and compound prompts, this disclosure will treat complex and compound prompts as equivalent for the purposes of explanation except where specifically stated.

Machine learning (ML) models are increasingly commonly used to process complex or compound queries. Complex prompts can, for example, demand retrieval of data from multiple or specialized sources, assembly of outputs (e.g. natural language, computer code, lists) from the retrieved data based on identified criteria, and/or subsequent processing of those outputs (e.g. transmission or archival to specified categories or locations and/or recipients). Existing solutions to complex prompt processing use large language model (LLM) planners to semantically decompose such prompts into multiple steps, then execute those steps either using the same LLM, or using native functions or databases. Tools for such approaches include Semantic Kernel and LangChain. Although many complex prompts most often involve sequential steps each contingent upon the results or outputs of previous steps, some complex prompts can also or instead include parallel tasks or steps, i.e., steps not contingent upon the results of some other steps.

The present disclosure presents systems and method for improving accuracy and reliability in complex prompt response through the use of multiple specialized machine learning models (MLMs). The present disclosure focuses principally on the use of specialized LLMs, but a person skilled in the art will understand that the approaches set forth below are mostly generalizable to other specialist MLMs, except where otherwise noted. In the most general case, this disclosure presents a system whereby general query processing is handled by a manager using a generalist or "jack-of-all trades" LLM or Meta-Language Model, but steps falling within specialized domains are advantageously handled by dedicated, specially-trained specialist LLMs selected by the manager. This disclosure provides advantageous examples of methods for multiple approaches to extracting useful information from multiple models for the execution of plan steps, as described in greater detail below. Some such approaches include feed-forward (serial) model evaluation, polling of multiple models, directed selection of specific models based on specialization domain, and combinations thereof.

FIG. 1 is a schematic diagram of prompt processing system 10, an illustrative example of a system disposed to receive and process prompts, particularly complex natural language prompts, and produce syntactically and semantically coherent outputs responsive to those prompts. FIG. 1 depicts hardware computing device 100 with processor 102, memory 104, and user interface 106 accessible to user 108. Complex prompt handling system 110 is instantiated at least partly within memory 104, and executable via processor 102 to generate outputs responsive to complex prompt 120. In some embodiments prompt processing system 10 can also include local device 130 directly connected to hardware computing device 100, and network 140 further connecting remote devices 142 and 144 to hardware computing device 100 indirectly. Remote device 144 can include computer-executable software accessible via API 146.

FIG. 1 focuses on hardware components of prompt processing system 10, and is provided as an illustrative example of a general hardware system for processing complex prompts. Software logic for prompt processing system 10 is primarily discussed below with respect to subsequent figures. The elements presented in FIG. 1, particularly including local device 130, network 140, and remote devices 142 and 144, can be omitted or replaced with analogous hardware in different architectures without departing from the scope and spirit of the present disclosure. In particular, although complex prompt handling system 110 is illustrated as instantiated in memory 104 of hardware computing device 100, subcomponents of complex prompt handling system 110 (see FIG. 2 and accompanying description) can in other embodiments be distributed across multiple hardware devices, including but not limited to remote and/or local devices a illustratively shown in FIG. 1 (130, 142, 144). Similarly, although hardware computing device 100 is illustrated as directly accessible to user 108, embodiments wherein hardware computing device 100 and therefore complex prompt handling system 110 are only accessible via intervening devices or steps also fall within the scope of the present disclosure.

Processor 102 is a logic-capable device configured to execute software, applications, and/or programs stored on memory 104. Examples of processor 102 can include one or more of a processor, a microprocessor, a controller, a digital signal processor (DSP), an application specific integrated circuit (ASIC), a field-programmable gate array (FPGA), or other equivalent discrete or integrated logic circuitry. Processor 102 can be entirely or partially mounted on one or more circuit boards.

Memory 104 is a machine-readable storage medium configured to store information including complex prompt handling system 110, and can most generally include both transitory and non-transitory storage media. In some examples, a computer-readable storage medium can include a non-transitory information storage medium. The term "non-transitory" can indicate that the storage medium is not embodied in a carrier wave or a propagated signal. In certain examples, a non-transitory storage medium can store data that can, over time, change (e.g., in RAM or cache). In some examples, memory 104 is or includes a temporary memory. As used herein, a temporary memory refers to a memory having a primary purpose that is not long-term storage. Memory 104, in some examples, is described as volatile memory. As used herein, a volatile memory refers to a memory that does not maintain stored contents when power to the memory 104 is turned off. Examples of volatile memories can include random access memories (RAM), dynamic random access memories (DRAM), static random access memories (SRAM), and other forms of volatile memories. In some examples, the memory is used to store program instructions for execution by the processor. The memory, in one example, is used by software or applications running on hardware computing device 100 (e.g., complex prompt handling system 110) to temporarily store information during program execution. Memory 104, in some examples, also includes one or more persistent computer-readable storage. Examples of such persistent, non-volatile storage elements can include, for example, magnetic hard discs, optical discs, floppy discs, flash memories, or forms of electrically programmable memories (EPROM) or electrically erasable and programmable (EEPROM) memories.

User interface 106 is an input and/or output device and/or software interface, and enables an operator, such as user 108, to control operation of and/or interact with software elements of computer hardware device 100. For example, user interface 106 can be configured to receive inputs from an operator and/or provide outputs. Most relevantly for the present disclosure, user interface 106 provides means for user 108 to supply complex prompt 120 to computer hardware device 100. User interface 106 can, for example, be a local interface including one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines. In other mutually consistent embodiments, user interface 106 can additionally or alternatively include means such as a wired or wireless transceiver for communicating with a remote user, e.g., through a remote device and/or over a local or wide area network.

Computer hardware system 100 receives complex prompt 120 from user 108 via user interface 106, as noted above.

Complex prompt 120 is interred in memory 104 as an input of complex prompt handling system 110 (see FIGS. 2-7), which is executed by processor 102 to produce a merged output advantageously leveraging the task-specific training of multiple domain-specialized LLMs.

Network 140 can be a local area network (LAN) such as a network connecting computer hardware device 100 to local user device and/or databases, or can be wide-area network (WAN) suitable for connecting computer hardware device 100 to servers and other computing components that are separated by greater geographic distances than the devices of a local network. Network 140 can include network infrastructure for connecting devices separated by larger geographic distances. In at least some examples, network 140 is the internet. For illustrative purposes, computer hardware device 100 can communicate with remote devices 142 and 144 via network 140. More generally, any number of remote devices can be communicatively connected to computer hardware device 100 via one or multiple networks 140.

As illustrated in FIG. 1, prompt processing system 10 can also include local device 130 and network 140 with remote devices 142 and 144. Devices 130, 142, and 144 are generalizations representing all hardware external to computer hardware device 100 that can be included in prompt processing system 10. Memory 104 and analogous memory situated on devices 130, 142, and/or 144 can contain retrievably housed data stored in a variety of storage formats or architectures, including as structured databases or application data, unstructured data (e.g., data lakes), or vector databases. In the most general case, remote devices 130, 142, and 144 can provide locations external to computer hardware device 100 for separate processors and with associated memory for remote data storage (e.g., databases or similar storage structures for context injection) or processing (e.g., of software including specialized LLMs as discussed in detail below). In some examples devices 100, 130, 142, and 144 can be only a few hardware devices in a cloud architecture. In an opposite example, prompt processing system 10 can eschew devices 130, 142, and 144 and handle all data storage and processing locally within computer hardware device 100. In the most general case, software functions described with respect to FIGS. 2-7, including various language models, Meta-Language Models, Large Language Models (LLMs), and logic software, can be distributed across any useful number of separate hardware devices.

Figure 3:
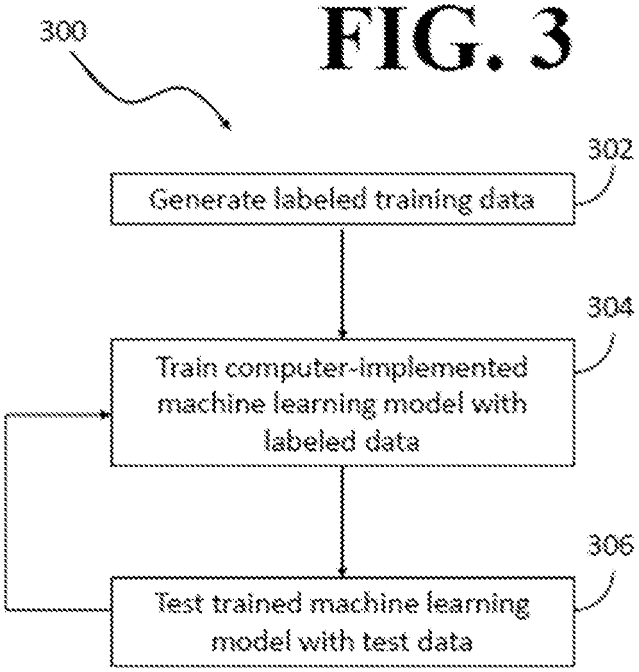
FIG. 3 is a method flowchart describing a simplified training method for generating language models of the prompt handling system of FIGS. 1 and 2 using guided machine learning.
Figure 4:
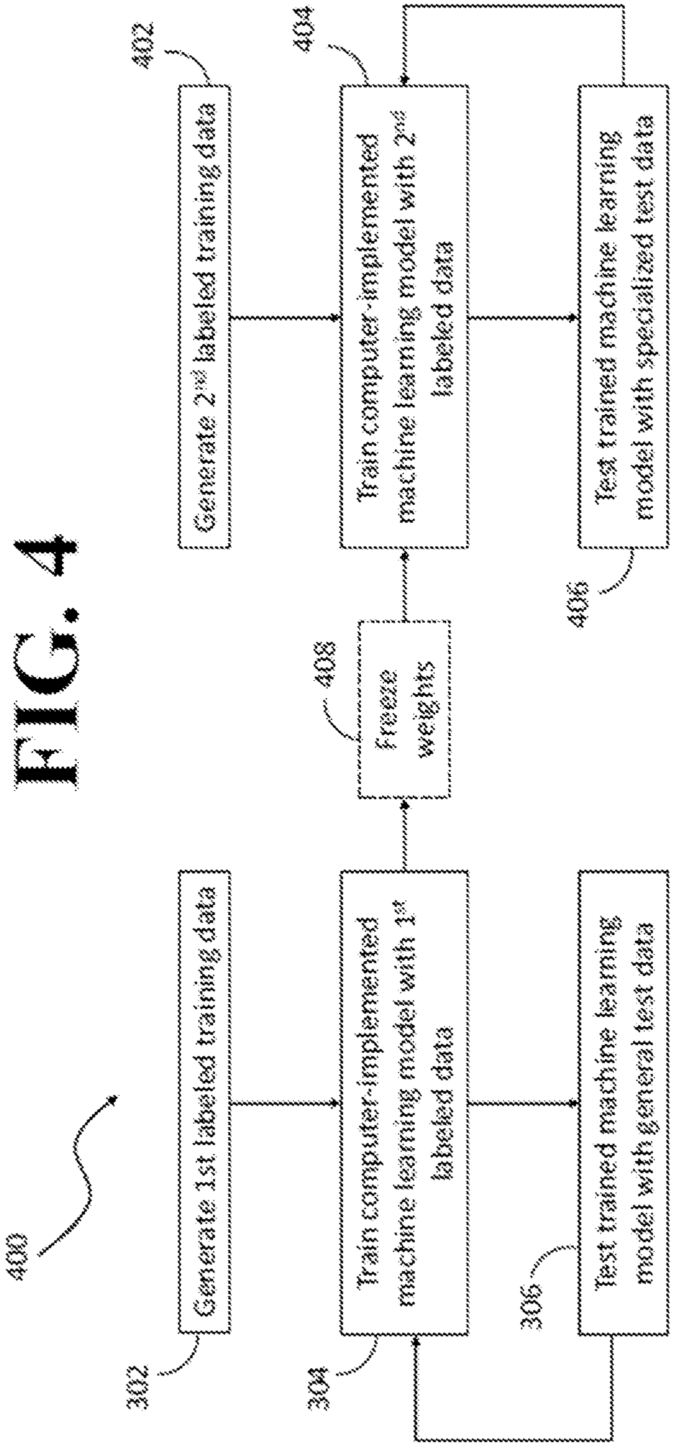
FIG. 4 is a method flowchart describing methods of further training for generating language models of the query handling system of FIGS. 1 and 2 using transfer learning and/or fine tuning.

FIG. 2 is a schematic diagram of complex prompt handling system 110. As noted above, complex prompt handling system 110 is instantiated in memory 104 and executed via processor 102 on computer hardware device 100. As shown in FIG. 2, complex prompt handling system includes manager 200 and several specialist models 220*a*-*n* with associated domain descriptors 222*a*-*n*. Manager 200 is made up of multiple software modules, including planner 202, selection module 204 (with model record 206), integration module 208, and model 210. Manager 200 receives complex prompt 120 from user interface 106, decomposes this complex prompt into several steps, and delegates these steps as appropriate to specialist models 220*a*-*n*, as described in greater detail below. The final results of these delegated steps, directly and/or indirectly, are assembled into a syntactically and semantically coherent final output responsive to complex prompt 120. The components of complex prompt handling system 110 are illustrated and described with reference to FIG. 2, while the process of operation of complex prompt handling system 110 is illustrated and described by reference primarily to FIGS. 5-7, below. FIGS. 3 and 4 illustrate training methods for various models within complex prompt handling system 110, including model 210 and specialist models 220*a*-*n*. FIGS. 3-7 are described separately below, but elements illustrated in FIG. 2 are best understood in view of FIGS. 2-7, together.

Manager 200 (with its various constituent modules 202-210) forms the core of complex prompt handling system 110 and is responsible both for initial processing of complex prompts for final assembly of outputs responsive to those complex prompts. Specialist models 220 (used herein to refer to any or all specialist models 220*a*-*n*) are MLMs, and in most embodiments specifically LLMs, that are trained for competence in specific domains identified by their respective domain descriptors 222 (used herein to refer to any or all domain descriptors 222*a*-*n*). Domain descriptors 222 can be natural-language terms or phrases identifying the specialization of their respective models 220, e.g., "mapping and routefinding," "email generation," or "mathematics." Advantageously, manager 200 delegates specific steps necessary for the execution of each complex prompt 120 to appropriate specialist models 220, thereby providing advantages from specialized training (efficiency, reliability, reduced hallucination, etc.) at each step, in a generalist overall system.

As noted above, specialist models 220 are MLMs such as LLMs that are trained for efficiency and reliability within specific domains. As illustrative examples, specialist model 220*a* can be a model fine-tuned to scrape data from websites, specialist model 220*b* can be a model trained to generate emails to match a style of a particular individual (i.e., from training data including a set of that person's sent emails), and specialist module 220*d* can be a MLM trained to perform chemical reaction mathematics. Specialist models 220 need not have anything in common with each other but their accessibility to manager 200. In FIG. 2, specialist models 220*d* and 220*e* are shown as situated on local device 130 and remote device 142 or 144, respectively. More generally, FIG. 2 illustrates that not all specialist models 220 need be situated on computer hardware device 100. In some instances specialist models may be proprietary third-party models accessed, e.g., through API 146, or first-party models retrieved or queried on as as-needed basis from separate or remote hardware. Specialist models 220 can, for example, be convolutional or recurrent neural network models. In alternative cases, some specialist models 220 can be random forest models or other decision-tree-like models. In all cases, however, specialist models 220 are models trained via machine learning, with at least a portion of this training including training data specific to a particular domain (e.g., web scraping, email mimicry, or mathematics, to carry forward the previous examples). This training data can be wholly manually labeled (i.e., for supervised learning) or partially manually labelled (i.e., for semi-supervised learning).

As noted above, manager 200 includes planner 202, selection module 204, integration module 208, and model 210. Model 210 is an LLM trained to process natural language prompts. In various embodiments model 210 can be used by various functional components of manager 200, including planner 202, selection model 204, and/or integration module 208. Although planner 202, selection module 204, and integration module 208 are herein described separately below in terms of function for the purpose of explanation, in some embodiments many functions of planner 202, selection module 204, and/or integration module 208 may be performed by providing prompts or context injections to model 210, i.e., to a single shared generalist LLM used by manager 200. In other embodiments, however, manager 200 can include multiple models 210, each dedicated specifically to a subset of modules 202, 204, and/or 208.

Planner 202 is a semantic processing module capable of decomposing a complex prompt into a plurality of steps. Planner 202 can, for example, be a planner such as used in conventional systems such as Semantic Kernel or LangChain. In the most general case, planner 202 can be any suitable natural language processing (NLP) agent capable of identifying a plurality of actionable tasks (i.e., steps) for the resolution of complex prompt 120. Planner 202 can, for example, make use of model 210 for generative production of a response to complex prompt 120 that identifies these actionable tasks. In some embodiments planner 202 can immediately output a plan (i.e., several steps) in direct response to the complex prompt. In other embodiments planner 202 can assemble the plan over several iterations, e.g., by identifying an initial task or set of tasks insufficient to completely address the complex prompt, then supplementing this partial plan with an additional step or steps in response to completion of the initial task or tasks. For simplicity of explanation, the following explanation does not distinguish between initially-generated and subsequently-generated steps.

Selection module 204 is responsible for identifying, for each step provided by planner 202, an approach to executing that step using specialist models 220. As described in greater detail below, selection module 204 is responsible for identifying, for each step identified by planner 202, a corresponding set of models to be queried at that particular step and a method by which this/these model(s) are to be queried. Selection module 204 can, by way of example, identify a subset of models suitable for execution each step from among all models (210 and 220) available within complex prompt handling system 110, and provide a prompt (general or step-specific, and either generated by planner 202 as a part of the plan, or generated by selection module 204 based on the plan and model record 206; see below) corresponding to the step in question to the selected each of the models of that subset.

Selection module 204 can include model record 206 that maps a domain to each specialist model 220, i.e., that reflects domain descriptors 222. Model record 206 can, in some examples, be generated or updated on-the-fly as specialist models 220 are added to or removed from complex prompt handling system 110. Model record 206 enables selection module 204 to perform intent identification of steps generated by planner 202 via model 210 (or another appropriate model) to identify specialist models 220 having a domain (i.e., subject-matter specialization) relevant to that intent. In some such embodiments, model 210 can be trained in model selection through provision of a large number of (step/task) prompts labeled as suited for a particular specialist model. In alternative embodiments, functions described herein by reference to planner 202 and selection module 204 can be performed inseparably based on context of complex prompt 120 using a meta-language model (i.e., wherein model 210 is a meta-language model) trained to identify specialist models 220 as a part of each plan step generated from complex prompt 120, or trained to semantically identify a task or type of task referenceable against domain descriptors 222.

Manager 200 delegates execution of a particular plan step to selected specialist models 220 by providing prompts corresponding to that step to the selected specialist models 220. In some embodiments, model record 206 can, in addition to mapping domains of each specialist model 220, also identify prompts rules, formats, or templates suitable for each or some specialist models 220, e.g., for context injection based on the designated model and the specific step, or complex prompt 120. More generally, prompts provided to models 210 and 220 can include retrieval automated generation (RAG) or other context injection to reduce hallucination or otherwise constrain outputs based on templates retrieved from or data validated through outside data storage, e.g., lists and/or vector and/or relational databases either stored in memory 104 or retrieved from other devices 130, 142, or 144. Unless otherwise specified, this context injection can be provided by manager 200 based on operation of selection module 204, or can be sourced externally to complex prompt handling system 110 based on the nature of prompt provided by selection module 204 to the selected specialist model.

Specialist models 220 advantageously offer improved performance within their specialized domains over using a generalist (general-purpose, jack-of-all-trades) model, but may be less capable outside of those specialized domains. Steps for which selection module 204 can identify no appropriate specialist model 220 are handled by model 210, or by another generalist model. Specialist models 220 can have domains of varying breadth. In some embodiments, complex prompt handling system 110 can include both specialist models with non-overlapping domains, and specialist models with overlapping domains, e.g., of broader or narrower scope. During the execution of each step generated by planner 202 in response to complex prompt 120, planner 202 may identify multiple relevant specialist models 220 to be separately or collectively prompted during that step, as discussed in greater detail below.

Integration module 208 is a natural language processing module disposed to generate a singular output responsive to the complex prompt based on the outputs of the steps of the plan generated by planner 202, as executed by specialist models 220 (and in some instances model 210) per delegation by selection module 204. Integration module 208 can, for example, include its own specialized LLM trained to aggregate these various model outputs into a semantically and syntactically coherent single output without introducing hallucinations or errors, or omitting information provided by the various specialist models 220. Alternatively, model 210 can be a generalist LLM (as described above) capable of performing this function using prompts generated by integration module 208 from the aforementioned outputs of specialist models 220 (and in some instances model 210), i.e. such that the same model 210 provides the trained machine learning backbone of integration module 208 and planner 202, selection module 204, or both. Integration module 208 can in some embodiments receive inputs from all designated specialist models 220 used in handling steps identified by planner. In other embodiments, where outputs of some specialist models 220 are used only to provide inputs to other specialist models 220 (see FIG. 6, described below), integration module 208 can receive only a subset of the outputs of specialist model 220. In some instances integration module 208 can also receive the plan produced by planner 202, and generate its output based a combination of the outputs of specialist models 220 and the plan and/or complex prompt 120. Inputs of integration module 208 can, for example, be aggregated into a LLM prompt using model 210. Although FIG. 2 illustrates a single integration module 208, some embodiments of complex prompt handling system 110 can include specialized integration modules suited to aggregating model outputs of particular types. Similarly, although integration module 208 is mainly described herein as a tool for generating the aforementioned singular output responsive to complex prompt 120, some embodiments of integration module(s) 208 can serve an intermediate function by structuring outputs of several specialist models 220 for use as prompts to other specialist models 220.

FIG. 3 presents training method 300, a simplified method for supervised or semi-supervised training of machine learning models such as models 210 and/or 220. Training method 300 includes the steps of generating training data (step 302), training the computer-implemented machine learning model with the training data (step 304), and testing the trained computer-implemented machine learning model with test data (step 306). Training method 300 is a method of machine learning that can be used to train any suitable computer-implemented machine learning model for use with complex prompt handling system 110 (see FIG. 2, discussed above) or method 700 (see FIG. 7, discussed below).

In step 302, the training data is generated. For training the computer-implemented machine learning model(s) used in complex prompt handling system 110, training data includes domain specific information with example inputs labeled (i.e. mapped to or tagged with) example outputs. Data can be labeled entirely manually or, to reduce labor, can be labeled in a semi-automated fashion, e.g. using clustering or analogy to manually labeled data. Each specialist model 220 is trained on different training data, although in some embodiments some specialist models 220 can be trained on training data that is a subset of or overlaps with training data used to train other specialist models 220.

In step 304, the labeled data is used to train each computer-implemented machine learning model (i.e. models 210, 220) to produce appropriate outputs given inputs within its domain. Assuming models operate within their domains, training in broader domains, i.e. of models intended for more general use, will produce less reliable or accurate outputs than narrower training, i.e. of more specialized models, for many applications. This is generally the case not only when conserving overall volume of training data (i.e. such that a model having a narrower domain has a higher density of training data within that domain), but also when conserving density of training data (i.e. where a comparatively less specialized model is trained with more data, but the subset of that training data corresponding to the domain of a narrower model is analogous to the entirety of training data used to train the narrower model). In other words, the introduction of out-of-domain training data to broaden or generalize model competence can, within some domains, produce less reliable or accurate outputs in-domain. As a consequence, specialist models 220 of various scopes can be useful so long as selection module 204 is capable of delegating tasks or steps intelligently.

As used herein, "training" a computer-implemented machine learning model refers to any process by which parameters, hyper parameters, weights, and/or any other value related model accuracy are adjusted to improve the fit of the computer-implemented machine learning model to the training data. The labeled data can be transformed by, for example, one or more programs and/or one or more other trained machine learning models before it is used for training in step 304.

In step 306, the trained computer-implemented machine learning model is tested with domain-specific test data. This test data is unlabeled data that can be used to qualify and/or quantify performance of the trained computer-implemented machine learning model. More specifically, a human or machine operator can evaluate the performance of the machine learning model by evaluating the fit of the model to the test data. Step 306 can be used to determine, for example, whether the machine learning model was overfit to the labeled data during model training in step 304.

As depicted in FIG. 3, steps 304 and 306 can be performed iteratively to improve the performance of the machine learning model. More specifically, if the fit of the model to the unlabeled data determined in step 306 is undesirable, step 306 can be repeated to further adjust the parameters, hyper parameters, weights, etc. of the model to improve the fit of the model to the test data. Step 306 can then be repeated with a new set of unlabeled test data to determine how the adjusted model fits the new set of unlabeled test data. If the fit continues to be undesirable, further iterations of steps 304 and 306 can be performed until the fit of the model becomes desirable.

Training method 300 can advantageously be used to train any machine learning model described herein. More generally, the systems and methods disclosed herein advantageously allow for the training and use of machine learning models that can be used for a general-purpose model (e.g. model 210) as well as for domain-specific specialist models (e.g. specialist models 220) by varying the scope of training of test data.

FIG. 4 illustrates training method 400, a simplified expansion of training method 300 to include fine tuning and/or transfer learning. Method 400 includes steps 302, 304, and 306 as described above with respect to FIG. 3, as well as parallel steps 402, 404, and 406 generally mirroring steps 302, 304, and 306. Method 300 can, for example, result in a trained model such as a neural network model, where training produces edge weights between nodes distributed across several network levels or depths. In one embodiment, FIG. 4 provides a method of fine-tuning this model by applying further training to this existing model according to substantially the same process set forth with respect to FIG. 3 (i.e. with steps 402, 404, and 406 generally qualitatively matching steps 302, 304, and 306), but with new training and testing data matching an altered domain. Fine-tuning of this kind can be used to improve the functioning of a broader (i.e. less specialized) model within a more specialized domain by providing a domain-constrained second set of labeled training data and testing the resulting model with more specialized test data. Alternatively or additionally, training method 400 can include transfer learning provided by freezing edge weights (step 408) of the model produced through iterations of step 304, and adding additional model layers adjustable through training in steps 402-406.

In some embodiments, model 210 can be a general purpose model produced by method 300, and at least some of specialized models 220 can be produced from model 210 via fine-tuning and/or transfer learning from model 210. In other embodiments, at least some specialized models 220 can be trained entirely independently of model 210, or even entirely independently of any more general model. In either case, the domain of training and testing data used for training specialist models 220 is narrower, i.e. more specialized, than the domain of training data used to train model 210.

Figure 6A:
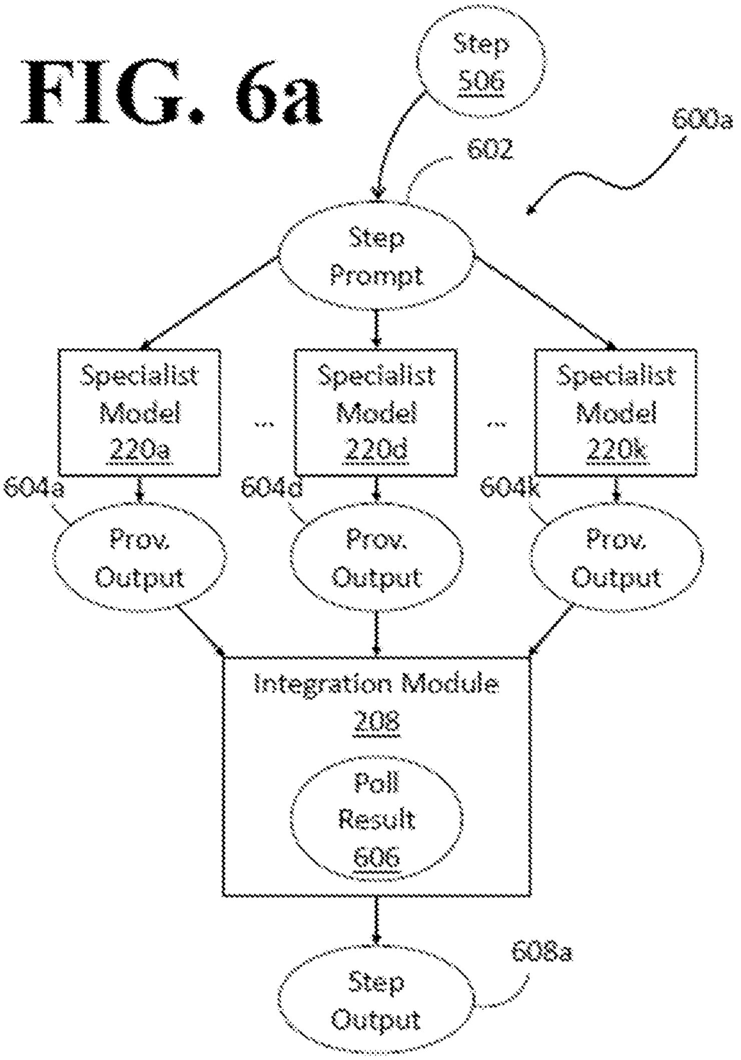
Figure 6B:
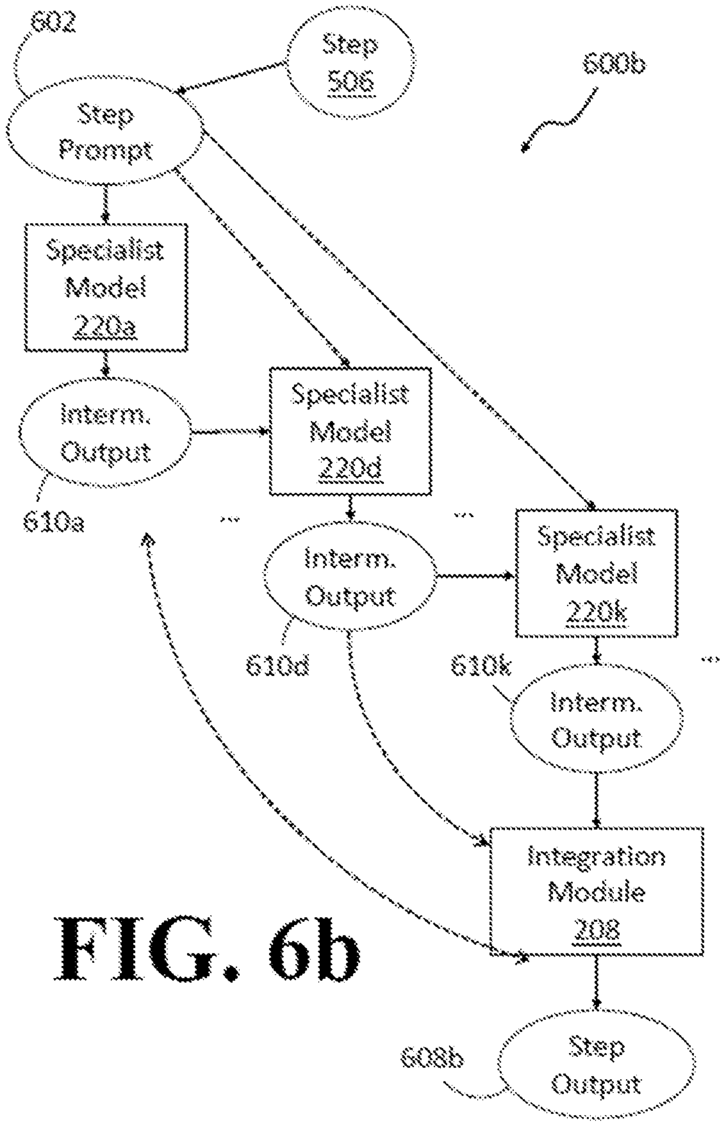
Figure 6C:
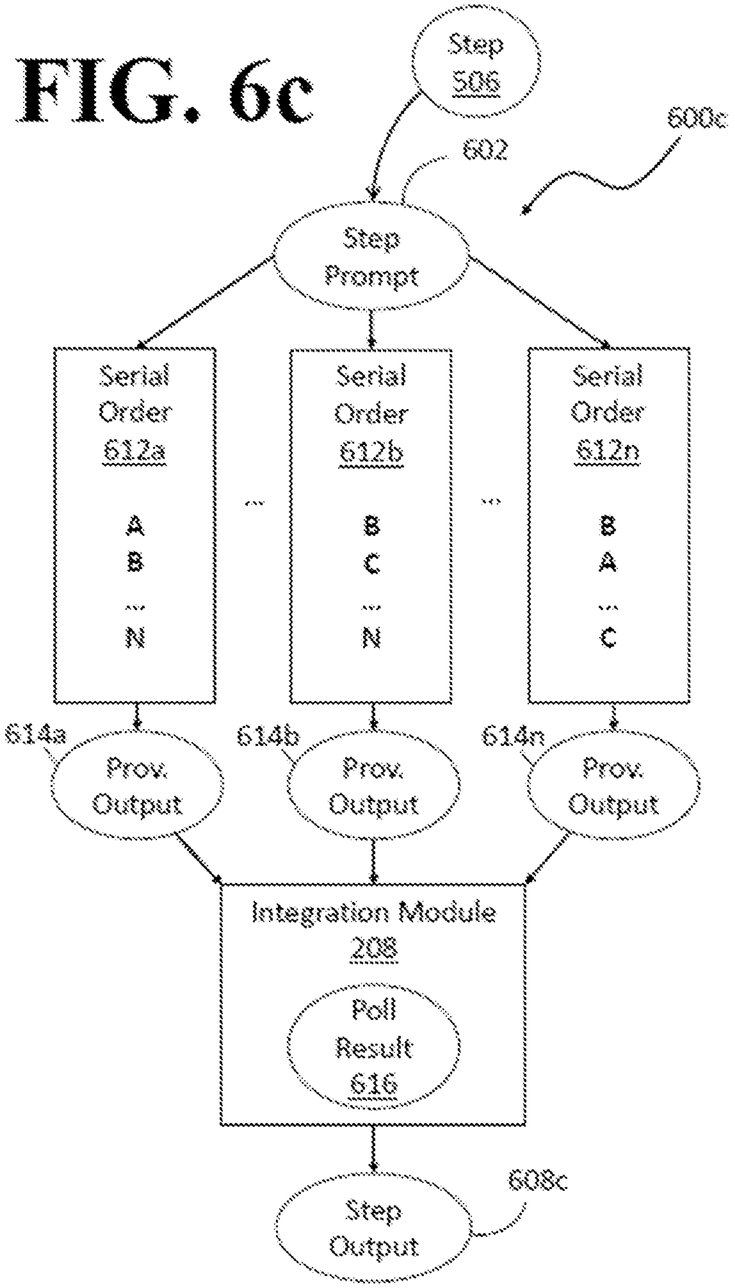

FIG. 5 is a flowchart illustrating process 500 for decomposing and processing complex prompt 120 using complex prompt handling system 110. Specifically, planner 202 generates plan 504 including several separate steps 506*a*, 506*b*, 506*c* (collectively or generically referred to hereinafter as steps 506). Steps 506 are provided for illustrative purposes only-more generally, plan 504 can include any number of steps 506 generated by planner 202 to address complex prompt 120. FIGS. 6*a*, 6*b*, and 6*c* are flowcharts illustrating processes 600*a*, 600*b*, and 600*c*, respectively, which depicts handling of an individual step 506 (of FIG. 5) in greater detail. FIGS. 5 and 6*a-c* are described together.

Each step 506 generated by plan 504 includes a task generally specifying an output. Steps 506 can take the form of prompts. Carrying forward the illustrative examples introduced with discussion of FIG. 2, step 506*a* could be "determine what products are currently discounted on GenericBrand website," and step 506*b* could be "generate a cheerful informational email from informing frequent GenericBrand buyers of new offers based on currently discounted products." Steps 506 can be executed in parallel, as illustrated in FIG. 5. Alternatively or additionally, some steps 506 can be executed in series, with outputs of previously executed steps 506 used as inputs to other steps 506.

As illustrated in FIG. 5, each step 506 is received by selection module 204, which generates a corresponding approach 508*a*, 508*b*, 508*c* (hereinafter collectively or generically referred to as approaches 508). Each approach 508 identifies means for extracting information from one or more models 220 to step 508. In the simplest possible case, approach 508 identifies a single relevant model 220 to execute step 506 and return an output to integration module 208. As discussed above with reference to FIG. 2, integration module 208 synthesizes final output 510 based on outputs from steps 506. Final output 510 is an output responsive to complex prompt 120. Preferably, final output 510 is a result or other output that fully addresses the intent of complex prompt 120 from user 108. Where user intent is unclear, or further information is needed from use 108 in order to provide a satisfactory result, final output 510 can instead or additionally include follow-up questions to user 108 prompting user 108 to provide additional information to supplement complex prompt 120.

Results from multiple steps 506 can be merged by integration module 208 (e.g. using model 210) at the stage of producing final output 510. In some embodiments, however, results from execution of one or more steps 506 using associated approach 508 can be inputs of other steps 506, as noted above.

As shown in FIG. 5, approaches 508 can vary between steps 506 (see approaches 508*i* and 508*j* for steps 506*a* and 506*c*, respectively), but need not be different for every step (see approach 508*i* used for both step 506*a* and step 506*b*).

FIGS. 6*a*-6*c* explore differences in approaches 508 in greater detail by reference to more complex cases wherein multiple models 220 may be relevant to execution of a step 506. More specifically, FIGS. 6*a*-6*c* illustrate processes 600*a*-600*c*, respectively, that present different approaches to gathering and synthesizing information from multiple specialist models 220. Process 600*a* presents a polling approach, process 600*b* a feed-forward approach, and process 600*c* a hybrid combinatorial approach. Identically numbered steps or objects common to FIGS. 6*a*-6*c* are discussed together herein.

As illustrated in FIG. 6*a*, Step 506 includes a step prompt 602. In some instances step 506 as generated by planner 202 may consist entirely of an associated step prompt 602 suitable for provision as a generative prompt to one or more of models 220. In other cases, however, steps 506 can include non-prompt information for use by other components of complex prompt handling system 110, such as sequence or order (i.e., within plan 504). Step prompt 602 consists of those portion of step 506 that include a prompt suitable for at least a subset of specialist models 220.

According to process 600*a*, step prompt 602 is provided to multiple specialist models 220*a*, 220*d*, and 220*k*, each of which produces a corresponding provisional output 604*a*, 604*d*, and 604*k* (generically or collectively provisional output(s) 604). Step prompt 602 can in some examples be provided to all specialist models 220 available in complex prompt handling system 110, and optionally additionally to (generalist) model 210. In other examples, however, prompt 602 can be provided only to specific models 220 with relevant domains, as defined by associated domain descriptors 222. For example, a step involving information retrieval regarding product listings can be addressed to specialist models 220 suitable for synthesizing information from databases or scraping information from websites, but not to other specialist models 220 dedicated to creative writing or chemical modeling. Different subsets of the full complement of specialist models 220 can be tasked by selection module 204 with different steps 506, according to different or similar approaches 508.

According to process 600*a*, Provisional outputs 604 are polled by integration module 208 to generate poll result 606. Poll result 606 identifies commonalities (if any are present) between provisional outputs 604 based on occurrence rates of same or similar results among provisional outputs 604. Agreement between provisional outputs 604 can be assessed by integration module 208 using model 210, e.g. prompting model 210 to determine whether and/or on what points provisional outputs 604 (provided as natural language) agree. Where a sufficient number of provisional outputs 604 agree (e.g., all or a majority of provisional outputs 604) on an output to step prompt 602 (i.e., as found in at least portions of multiple provisional outputs 604), integration module 208 can output this majority or consensus result as step output 608*a*. Where there is no agreement among provisional outputs 604, step output 608*a* can instead reflect that the result of step 506 is unknown or indeterminate. In some such nonconvergent cases, final output 510 may include a follow-up questions or requests for clarification from user 108. In some examples, results common across a sufficient minority (e.g. a plurality) of provisional outputs 604 can also be included among step output 608*a* based on poll results 606. Poll results 606 that are further from consensus among provisional outputs 604 can, in some embodiments, be correspondingly flagged as of lower confidence.

Process 600*b* represents a different approach from process 600*a*, discussed above. Specifically, process 600*b* describes a feed-forward (i.e. serial) approach to processing step 506. According to process 600*b*, step prompt 602 is transmitted to one specialist model 220*a*, which produces a corresponding intermediate output 610*a*. This intermediate output 610*a* is provided as input to another specialist model 220*d*, which likewise produces a corresponding intermediate output 610*d*. This approach can contain any number of serially-linked specialist models 220 (illustrated as three models 220*a*, 220*d*, 220*k*), the final intermediate output 610*k* of which is provided to integration module 208 for generation of step output 608*b* responsive to step 506. In some versions of process 600*b*, some or all downstream specialist models (e.g., 220*d*, 220*k*) can also be provided with step prompt 602 (i.e., in addition to feed-forward inputs from a preceding model). Similarly, integration module 208 can also receive non-terminal intermediate outputs (e.g., 610*a*, 610*d*) in some versions of process 600*b*, and aggregate these results when producing step output 608*b*.

Any set of multiple specialist models 220 can be combined serially according to the feed-forward approach presented in process 600*b* in combinatorially multiple ways. FIG. 6*c* illustrates a hybrid approach according to process 600*c*, with different serial orders of 612*a-n* (generically or collectively serial order(s) 612) producing different terminal intermediate outputs (as intermediate output 610*k*; see FIG. 6*b*) treated as provisional outputs 614*a-n* (generically or collectively serial order(s) 614), respectively, which are polled by integration module 208 to produce poll result 616 and thereby step output 608*c* generally as described with respect to poll result 606 and step output 608*a* in reference to FIG. 6*a*. Serial orders 612 represent different feed-forward sequences traversing between selected specialist models 220. Serial orders 612 can, for example, consist of reordering of the same set of specialist models 220. In other embodiments, however, different serial orders 612 can also include different subsets of all available specialist models 220. Process 600*c* can traverse the full multidimensional (combinatorial) space of model serial orders available, based on the number of relevant specialist models 220 present within complex prompt handling system 110.

In some examples, different approaches 508 described with reference to FIGS. 6*a-c* can be used instead of relying on domain descriptors 222 to identify the most relevant specialist model(s) 222 for execution of each step 506. In other cases, domain descriptors 222 can still be used by selection module 204 to define a subset of relevant specialist models 220 for each step 506, but this selection can be comparatively relaxed, relying on polling, feed-through, or both to produce an aggregate result from multiple models that limits errors or hallucinations in step outputs 608. As noted with reference to FIG. 5, different approaches 508 can be used for different steps 506. In an alternative to processes 600*a-c*, some approaches 508 can use directed selection of a specific models 220 based on model record 206 and/or domain descriptors 222, e.g. by delegating to a singular model identified by selection module 204 as appropriate to a specific task type relevant to the associated step 506, e.g. based on semantic analysis of step prompt 602 and domain descriptors 222. Processes 600*a-c* can be seen as means for producing reliable step outputs 608 without a singular clearly best-suited specialist model 220, and/or as means for leveraging training of diverse models 220 even where a suitably specialized model is available. As an expansion of approaches set forth in FIGS. 6*a* and 6*c*, integration module 208 can, in some embodiments, weigh results from models 220 having particularly closely-aligned domain descriptors 222 more heavily than results from other models, when producing poll results 606/616 and corresponding step outputs 608*a*/*c*.

FIG. 7 is a method flowchart illustrating method 700. Method 700 provides an overview of the approach set forth in FIGS. 2, 5, and 6 whereby prompt processing system 10 decomposes complex prompt 120 into steps, handles each step with a selected approach 508, and generates a final output 510 from these intermediate step results. Method 700 begins with the receipt of complex prompt 120 from user 108 via user interface 106 (see FIG. 1). (Step 702). Planner 202 of manager 200 within complex prompt handling system 110 then generates a plan 504 based on complex prompt 120 (see FIG. 2 and associated description). (Step 704). Plan 504 can include any number of steps 506. For each step 506, so long as steps remain (evaluation 706), selection module 204 of manager 200 in complex prompt handling system 100 selects an approach 508 for addressing that step 506 using an appropriate subset of models 220 (see FIGS. 5 and 6). (Step 708). A step output 608 is generated by integration module 208 of manager 200 for each step 506 using the selected approach. (Step 710). In some embodiments, step outputs 612 can be used in the completion of downstream steps, as noted with reference to FIGS. 2 and 5. Once step outputs 612 for each step 506 have been produced, integration module 208 of manager 200 in complex prompt handling system 110 integrates these results (Step 714) to produce final output 510 (Step 716), a unified output responsive to complex prompt 120.

The systems and method set forth above advantageously allow specialized machine learning models to be leveraged to complete relevant steps of complex prompt responses, thereby enabling system 10 as a whole to exhibit broad general competence across a wide range of subject matter while reducing hallucination and error rate compared to purely generalist model-based approaches. This is accomplished by separately training multiple specialist models 220, and by identifying and traversing a relevant subset of specialist models 220 with respect to each step 506 involved in responding to complex prompt 120 via an appropriate approach 508.

DISCUSSION OF POSSIBLE EMBODIMENTS

A method of processing a compound prompt using a plurality of specialized large language models (LLMs), the method comprising: decomposing the compound prompt into a plan having a plurality of steps via a planner module instantiated in machine-readable memory and operable by a processor; and for each of the plurality of steps: selecting an approach for producing a step output using a selection module, the approach defining a subset of the plurality of specialized LLMs; generating model outputs based on the step from each of the subset of the plurality of specialized LLMs; and generating, from the model outputs generated by each of the subset of the plurality of specialized LLMs, a step output responsive to the step; and assembling all of the step outputs into a syntactically and semantically coherent final output via an integration module utilizing a large language model.

The method of the preceding paragraph can optionally include, additionally and/or alternatively, any one or more of the following features, configurations and/or additional components:

A further embodiment of the foregoing method, wherein generating model outputs based on the step from each of the subset of the plurality of the LLMs comprises providing a step prompt comprising at least a portion of the step to each of the subset of the plurality of LLMs, in parallel.

A further embodiment of the foregoing method, wherein generating model outputs based on the step from each of the subset of the plurality of the LLMs comprises traversing multiple of the subset of the plurality of specialized LLMs in series by: generating a first model output from a step prompt comprising at least a portion of the step using a first of the subset of the plurality of LLMs; and generating a second model output at least partly based on the first model output, using a second of the subset of the plurality of LLMs, wherein the step output is generated at least partly as a function of the second model output.

A further embodiment of the foregoing method, wherein generating model outputs based on the step comprises traversing multiple combinatorial permutations of the subset of the plurality of specialized LLMs in different series, with each traversed combinatorial permutation of the subset of the plurality of specialized LLMs in a particular series producing a corresponding model output.

A further embodiment of the foregoing method, wherein selecting the approach for producing a step comprises selecting, for each step, a model subset traversal method from a set of available traversal methods, the set of available traversal methods comprising: a first subset traversal method whereby model outputs are generated using the subset of the plurality of LLMs, in parallel; and a second subset traversal method whereby model outputs are generated in series, with an output of at least a first of the subset of the plurality of LLMs used as an input of at least a second subset of the plurality of LLMs.

A further embodiment of the foregoing method, further comprising associating a domain descriptor with each of the plurality of specialized large language models.

A further embodiment of the foregoing method, wherein the set of available traversal methods further comprises directed selection of an output of one of the plurality of LLMs based on relevance of the domain descriptor of the step.

A further embodiment of the foregoing method, wherein at least a subset of the plurality of specialized LLMs are subject-matter specialized in domains corresponding to their respective domain descriptors via fine-tuning or transfer learning.

A further embodiment of the foregoing method, wherein generating the step output responsive to the step comprises polling multiple of the model outputs to ascertain commonalities between the model outputs.

A further embodiment of the foregoing method, wherein: polling multiple of the model outputs comprises ascertaining majority or plurality outputs from among the multiple of the model outputs; and generating the step output comprises identifying the majority or plurality outputs as the step output.

A further embodiment of the foregoing method, wherein: the model outputs are generated in parallel from each of the subset of the subset of the plurality of LLMs, without references to others of the plurality of LLMs; and polling multiple of the model outputs comprises polling all of the outputs of the subset of the plurality of the LLMs in parallel.

A further embodiment of the foregoing method, wherein polling multiple of the model outputs comprises polling final outputs of multiple combinatorial permutations of the subset of the plurality of LLMs, operating in series.

A system for generating a response to a complex prompt, the system comprising: an input device configured to receive the complex prompt; a logic processor; machine-readable memory; a plurality of specialized large language models (LLMs) instantiated in the machine-readable memory, each of the specialized LLMs having a corresponding domain of specialization; and a manager comprising: a planner instantiated in the machine-readable memory and operable via the logic processor to decompose the complex prompt into a plan having a plurality of steps; a selection module instantiated in the machine-readable memory and operable via the logic processor, for each of the plurality of steps, to identify an approach for defining a step-specific subset of the plurality of specialized LLMs, and for generating a single step output corresponding to that step using outputs from each of step-specific subset of the plurality of specialized LLMs; and an integration module instantiated in the machine-readable memory and operable via the logic processor to generate a language output responsive to the complex prompt from all of the step outputs corresponding to each of the plurality of steps.

The system of the preceding paragraph can optionally include, additionally and/or alternatively, any one or more of the following features, configurations and/or additional components:

A further embodiment of the foregoing system, wherein the approach specifies one of: receiving a model output based on the respective step from each of the step-specific subset of the plurality of specialized LLMs, in parallel; and receiving a model output from pass-forward serially chained calls of each of the step-specific subset of the plurality of specialized LLMs, beginning with a model input based on the respective step.

A further embodiment of the foregoing system, wherein receiving a final model output from pass-forward serially chained calls of each of the step-specific subset of the plurality of specialized LLMs comprises traversing multiple permutations of serial orders of the step-specific subset of the plurality of LLMs.

A further embodiment of the foregoing system, wherein generating the single step output comprises generating an aggregated output based on polling the model outputs of either: the received model outputs of each of the step-specific subset of the plurality of specialized LLMs, in parallel; or final model outputs of each of the multiple permutations of serial orders of the step-specific subset of the plurality of specialized LLMs.

A further embodiment of the foregoing system, wherein the traversing multiple permutations of serial orders of the step-specific subset of the plurality of specialized LLMs comprises all combinatorial permutations of serial orders of the step-specific subset of the plurality of specialized LLMs.

A further embodiment of the foregoing system, further comprising a generalist Meta-Language Model (MLM), wherein the integration module utilizes the generalist MLM to produce the language output.

A further embodiment of the foregoing system, wherein selection module uses the generalist MLM to identify the step-specific subset of the plurality of specialized LLMs, for each step.

A further embodiment of the foregoing system, further comprising a plurality of domain descriptors each associated with one of the plurality of specialized LLMs and used by the selection module to determine the step-specific subset of the plurality of specialized LLMs, for each step.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of processing a compound prompt using a plurality of specialized large language models (LLMs), the method comprising:

training a plurality of language models (LMs) including an integration module LM and a plurality of specialized LLMs, wherein:

each of the plurality of LMs is trained using training data different from all others of the plurality of LMs; and each of the plurality of specialized LLMs corresponds to a specific specialist domain, and is trained at least partly using training data specific to its respective specialist domain;

decomposing the compound prompt into a plan having a plurality of steps via a planner module instantiated in machine-readable memory and operable by a processor; and for each of the plurality of steps:

selecting an approach for producing a step output using a selection module, the approach defining a subset of the plurality of specialized LLMs;

generating model outputs based on the step from each of the subset of the plurality of specialized LLMs; and generating, from the model outputs generated by each of the subset of the plurality of specialized LLMs, a step output responsive to the step, wherein for at least one of the plurality of steps, the approach specifies receiving a model output from pass-forward serially chained calls of each of the subset of the plurality of specialized LLMs, beginning with a model input based on the respective step, and wherein receiving a final model output from pass-forward serially chained calls of each of the subset of the plurality of specialized LLMs comprises traversing multiple permutations of serial orders of the step-specific subset of the plurality of LLMs; and assembling all of the step outputs into a syntactically and semantically coherent final output via an integration module utilizing the integration module LM.

2. The method of claim 1, wherein generating model outputs based on the step from each of the subset of the plurality of the LLMs comprises providing a step prompt comprising at least a portion of the step to each of the subset of the plurality of LLMs, in parallel.

3. The method of claim 1, wherein generating model outputs based on the step from each of the subset of the plurality of the LLMs comprises traversing multiple of the subset of the plurality of specialized LLMs in series by:

generating a first model output from a step prompt comprising at least a portion of the step using a first of the subset of the plurality of LLMs; and generating a second model output at least partly based on the first model output, using a second of the subset of the plurality of LLMs, wherein the step output is generated at least partly as a function of the second model output.

4. The method of claim 3, wherein generating model outputs based on the step comprises traversing multiple combinatorial permutations of the subset of the plurality of specialized LLMs in different series, with each traversed combinatorial permutation of the subset of the plurality of specialized LLMs in a particular series producing a corresponding model output.

5. The method of claim 1, wherein selecting the approach for producing a step comprises selecting, for each step, a model subset traversal method from a set of available traversal methods, the set of available traversal methods comprising:

a first subset traversal method whereby model outputs are generated using the subset of the plurality of LLMs, in parallel; and a second subset traversal method whereby model outputs are generated in series, with an output of at least a first of the subset of the plurality of LLMs used as an input of at least a second subset of the plurality of LLMs.

6. The method of claim 5, further comprising associating a domain descriptor with each of the plurality of specialized large language models, the domain descriptor corresponding to the specialist domain of the training of that specialized model.

7. The method of claim 6, wherein the set of available traversal methods further comprises directed selection of an output of one of the plurality of LLMs based on relevance of the domain descriptor of the step.

8. The method of claim 1, wherein at least a subset of the plurality of specialized LLMs are subject-matter specialized in domains corresponding to their respective domain descriptors via fine-tuning or transfer learning.

9. The method of claim 1, wherein generating the step output responsive to the step comprises polling multiple of the model outputs to ascertain commonalities between the model outputs.

10. The method of claim 9, wherein:

polling multiple of the model outputs comprises ascertaining majority or plurality outputs from among the multiple of the model outputs; and generating the step output comprises identifying the majority or plurality outputs as the step output.

11. The method of claim 10, wherein:

the model outputs are generated in parallel from each of the subset of the subset of the plurality of LLMs, without references to others of the plurality of LLMs; and polling multiple of the model outputs comprises polling all of the outputs of the subset of the plurality of the LLMs in parallel.

12. The method of claim 9, wherein polling multiple of the model outputs comprises polling final outputs of multiple combinatorial permutations of the subset of the plurality of LLMs, operating in series.

13. A system for generating a response to a complex prompt, the system comprising:

an input device configured to receive the complex prompt;

a logic processor;

machine-readable memory;

a plurality of language models (LMs) instantiated in the machine-readable memory and comprising:

an integration module LM; and a plurality of specialized large language models (LLMs) each having a corresponding domain of specialization;

wherein each of the plurality of LMs is trained using training data different from all others of the plurality of LMs, and each of the plurality of specialized LLMs is trained at least partly using training data specific to its respective specialist domain; and a manager comprising:

a planner instantiated in the machine-readable memory and operable via the logic processor to decompose the complex prompt into a plan having a plurality of steps;

a selection module instantiated in the machine-readable memory and operable via the logic processor, for each of the plurality of steps, to identify an approach for defining a step-specific subset of the plurality of specialized LLMs, and for generating a single step output corresponding to that step using outputs from each of step-specific subset of the plurality of specialized LLMs; and an integration module instantiated in the machine-readable memory and operable via the logic processor to generate a language output responsive to the complex prompt from all of the step outputs corresponding to each of the plurality of steps;

wherein for at least one of the plurality of steps, the approach specifies receiving a model output from pass-forward serially chained calls of each of the step-specific subset of the plurality of specialized LLMs, beginning with a model input based on the respective step, and wherein receiving a final model output from pass-forward serially chained calls of each of the step-specific subset of the plurality of specialized LLMs comprises traversing multiple permutations of serial orders of the step-specific subset of the plurality of LLMs.

14. The system of claim 13, wherein, for at least one of the plurality of steps, the approach specifies receiving a model output based on the respective step from each of the step-specific subset of the plurality of specialized LLMs, in parallel.

15. The system of claim 13, wherein generating the single step output comprises generating an aggregated output based on polling the model outputs of either:

the received model outputs of each of the step-specific subset of the plurality of specialized LLMs, in parallel; or final model outputs of each of the multiple permutations of serial orders of the step-specific subset of the plurality of specialized LLMs.

16. The system of claim 13, wherein the traversing multiple permutations of serial orders of the step-specific subset of the plurality of specialized LLMs comprises all combinatorial permutations of serial orders of the step-specific subset of the plurality of specialized LLMs.

17. The system of claim 13, wherein the integration module LM is a generalist Meta-Language Model (MLM).

18. The system of claim 17, wherein selection module uses the generalist MLM to identify the step-specific subset of the plurality of specialized LLMs, for each step.

19. The system of claim 13, further comprising a plurality of domain descriptors each associated with one of the plurality of specialized LLMs and used by the selection module to determine the step-specific subset of the plurality of specialized LLMs, for each step.

* * * * *